A. S. CUBITT.
RELAY.
APPLICATION FILED MAY 22, 1908.
923,247.
Patented June 1, 1909.
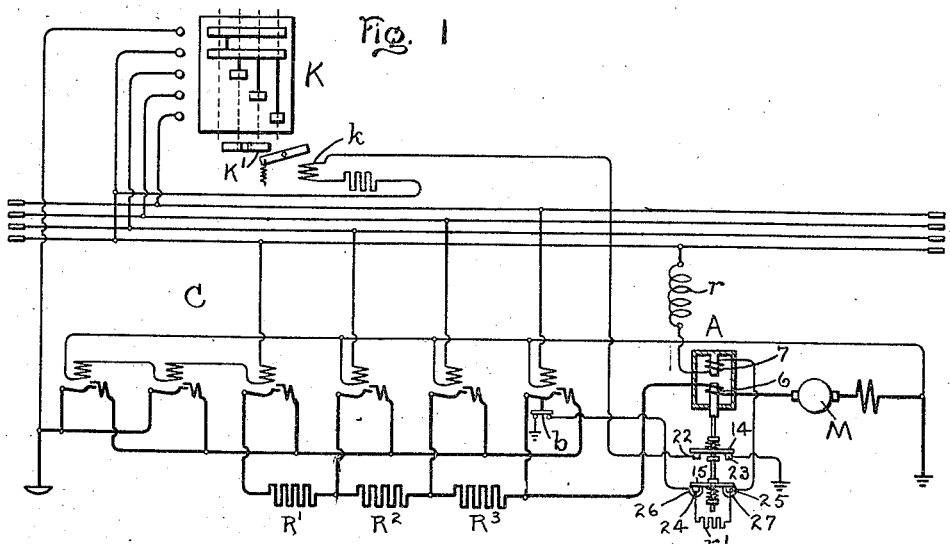
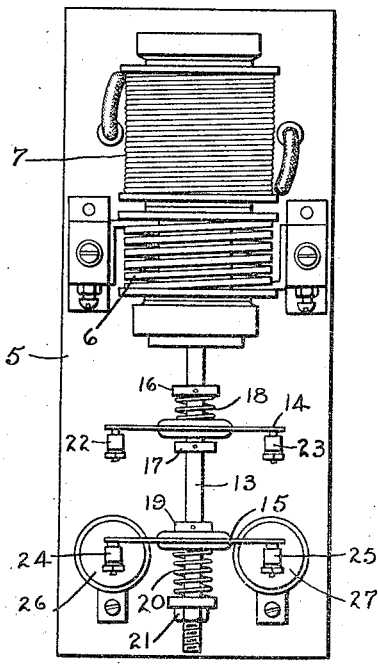
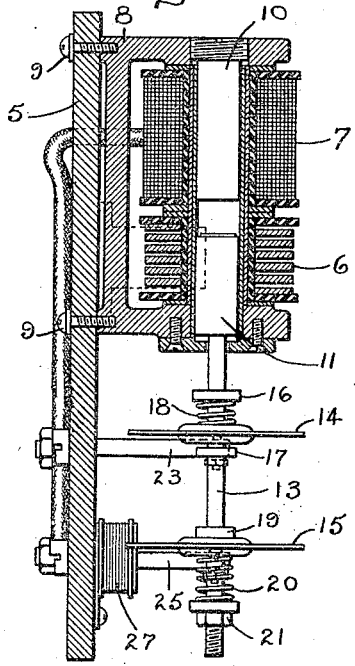
WITNESSES:
Lester H. Fulmer
J. Ellis Glenn
INVENTOR
ARCHIBALD S. CUBITT.
BY Albert H. Davis
ATTY.

UNITED STATES PATENT OFFICE.

ARCHIBALD S. CUBITT, OF SCHENECTADY, NEW YORK, ASSIGNOR TO GENERAL ELECTRIC COMPANY, A CORPORATION OF NEW YORK.

RELAY.

No. 923,247.  Specification of Letters Patent.  Patented June 1, 1909.

Application filed May 22, 1908. Serial No. 434,251.

*To all whom it may concern:*

Be it known that I, ARCHIBALD S. CUBITT, a subject of the King of Great Britain, residing at Schenectady, county of Schenectady, State of New York, have invented certain new and useful Improvements in Relays, of which the following is a specification.

My invention relates to relays, such as are used in connection with the control of dynamo-electric machines, and particularly to that class of relays which, under the control of a circuit in which the current varies, operate to open and close contacts in a circuit which it is desired to control. The ordinary forms of relays used for this purpose comprise a single current carrying coil which is connected in the circuit carrying the variable current and within which an iron core is arranged for movement being adapted to open and close contacts in the circuit to be controlled. After the core of such a relay has pulled up the current required to hold it in its raised position is much less than that required to pull it up or, in other words, with a relay of this kind there is a considerable difference between its raising and dropping current.

An object of my invention is to provide and arrange a relay which will pull up and drop within a small change of current.

In systems of motor control in which the speed of the motor is regulated by the amount of resistance in the motor circuit, or, if more than one motor is used, by also changing the relation of the motors to one another, these changes being made by a controller, means is often provided for retarding the movement of the controller in case the current in the motor circuit rises higher than a certain value. A convenient form of such retarding means consists in an electro-magnetically operated locking device for the controller, the operation of said locking device being governed by a relay, the actuating coil of which is controlled from the motor circuit. The ordinary form of relay, which after it has pulled up will not drop until the current through its actuating coil has fallen very considerably, is unsuitable for the motor control system above mentioned, since it will keep the controller locking device in action long after the motor current has fallen below the dangerous value. My improved form of relay is, therefore, particularly adapted for use in connection with control systems of the above described kind since it causes the retardation of the controller only while the current in the motor circuit is truly dangerous.

In a patent, No. 873,729, dated December 17, 1907, throttle relay, issued to my assignee, General Electric Company, and in my co-pending application, Serial No. 391,694, filed September 6, 1907, relay, I have set forth other forms and arrangements of relay having the same objects in view as in the present case.

My invention, in the particular embodiment hereinafter described, comprises a relay having an actuating coil energized from a circuit in which the current varies, a second coil energized from any source and arranged to produce a magnetic field in opposition to and in excess of that normally produced by the actuating coil, a core of magnetic material movable in the field of said coils, means for decreasing the magnetic effect of the second coil when said core has moved into the field and for increasing the magnetic effect of that coil when said core has moved out of said field, and contacts in the circuit to be controlled opened and closed by said core in its movement.

My invention will be clearly understood from the following description taken in connection with the accompanying drawing, in which is illustrated one embodiment thereof.

Figure 1 shows diagrammatically a simple system of motor control having my invention embodied therein; Fig. 2 is a front elevation of the relay shown in Fig. 1; and Fig. 3 is a side elevation of said relay, partly in section.

Referring to the drawing, 5 indicates the back or base of insulating material upon which the parts of the relay are mounted. The actuating coil of the relay is shown at 6 and may be of any desired number of turns of heavy conductor. A second coil 7 of finer wire is shown so arranged adjacent the coil 6 that the fields produced by the two coils will merge. The coils 6 and 7 are supported in an iron U-shaped frame 8 which may be fastened to the base 5 in any suitable manner, as by screws 9. A fixed iron core 10 may be screwed into the top of the frame 8 and arranged to project downward into the coil 7, as shown in Fig. 3. A movable core 11 of magnetic material is arranged for movement within the actuating coil 6, as shown and projecting downwardly from this core is a rod 13 upon which are mounted a contact disk 14 of conducting material and a contact disk 15 of conducting and magnetic material such as steel. The disk 14 may be arranged as shown between collars 16 and 17 secured to the rod 13, a spring 18 serving to hold the disk yieldingly against the collar 17 in a well-known manner. The disk 15 is arranged below a collar 19 secured to the rod 13, being yieldingly held in engagement with this collar by a spring 20, the tension of which may be adjusted by a nut 21 screwing upon the threaded end of the rod 13. The disk 14 engages with fixed contacts 22 and 23 of any suitable form. The disk 15 engages with fixed contacts 24 and 25 of magnetic material which are surrounded, respectively, by coils 26 and 27 which are connected in series with said contacts and when energized serve to produce a magnetic field which tends to hold the steel disk 15 in engagement with the fixed contacts 24 and 25 during the greater part of the upward movement of the core in a manner well-known to those familiar with this art. The arrangement of the collars 17 and 19 is such that when the core of the relay is down it will be supported by the engagement of the disk 15 with its coöperating fixed contacts, while the disk 14 will be pressed against its coöperating contacts by the spring 18, thereby insuring good electrical connections between the disks and the fixed contacts. The mechanical construction of the relay is very similar to that of the relay shown in my Patent No. 873,729, referred to, and contains no mechanical features not well-known to those familiar with this art. The electrical arrangement of the relay and its relation to the circuit which controls it and the circuit which it controls are, however, new as will now be pointed out in a description of its mode of operation when incorporated in the system of control illustrated diagrammatically in Fig. 1.

The system shown in Fig. 1 is of the separately-actuated contact type in which the master switch is provided with a locking device which will restrain it from further movement if at any time the current in the motor circuit exceeds a certain value, the operation of this locking device being controlled by the relay hereinbefore described and shown diagrammatically at A. In Fig. 1 M indicates a motor; $R^1$ $R^2$ and $R^3$ are resistance sections adapted to be introduced into the motor circuit and eliminated therefrom in accelerating; C is a motor controller of the separately actuated contact type adapted to connect the motor to a source of supply and regulate the amount of resistance in the motor circuit; K is a master switch governing the operation of the motor controller; and $K^1$ is an electromagnetic locking device for the master switch of any well-known form. The relay A has its actuating coil 6 connected in the motor circuit. The second coil 7 of the relay is connected on one side through an inductive resistance $r$, to the source, through contacts closed by the master switch in all its "on" positions, and on its other side is connected to ground through the magnetizing coils 26 and 27, contacts 24 and 25, and the disk 15, and through an auxiliary switch $b$ opened by the last resistance controlling switch in closing. A resistance $r^1$ is connected between the fixed contacts 24 and 25 and is, therefore, interposed in the circuit of the coil 7 upon the disk 15 breaking connection with these contacts. The coils 6 and 7 are so wound and the direction of the currents through them is such, that the fields produced by these coils oppose one another. Furthermore, the field produced by the coil 7 is, under normal values of motor current, enough stronger than that produced by the coil 6, when the resistance $r^1$ is short-circuited by engagement of the disk 15 with the contacts 24 and 25, to produce a resultant magnetic field which will cause the core of the relay to rise. The core in rising will lift the disk 15 and cut the resistance $r^1$ in circuit with the coil 7, thereby decreasing the strength of the magnetic field produced by this coil but not sufficiently to cause the core of the relay to drop. The core of the relay will drop only when the current in the motor circuit rises to such a value that the field produced by the coil 6 in opposition to that produced by the coil 7 will reduce the resultant field in strength below that required to hold the core of the relay up. By adjusting the value of the resistance $r^1$ the motor current at which the relay will drop can be easily regulated. The contacts 22 and 23 are connected in circuit with the actuating coil $k$ of the locking mechanism on the master switch, and when the core of the relay is down the disk 14 completes the circuit through the actuating coil $k$ and operates the locking device. Upon closing of the last resistance controlling switch the auxiliary switch $b$ is opened and the circuit through the coil 7 of the relay is interrupted, thereby preventing waste of current in this coil.

From the foregoing description it is clear that the master switch K will, in its first position, cause the motor to be connected to line through all the resistance, R¹, R² and R³ and that the successive points on the master switch provide for operation of the switches which cut out the sections of resistance. When the master switch is turned to its first position the coil 7 of the relay A is at once connected to the source and were it not for the inductive resistance r arranged in series with this coil, the core of the relay might at once pull up, thereby interrupting the circuit through the coil k and releasing the lock K' which had operated immediately when the master switch was brought to its first position. The inductive resistance r, however, impedes the first rush of current through the coil 7 sufficiently to allow the current in the motor circuit through he coil 6 to build up and hold the core of the relay in its lower position if the motor current reaches the value at which this relay is designed to operate. In this way the master switch is prevented from being moved through its first few positions without being subject to the control of the locking device. When the current in the coil 7 has risen to its maximum value and the current in the motor circuit through the coil 6 has dropped to a safe value, the relay pulls up and opens the circuit through the coil k of the locking device, thereby causing the latter to release the master switch and permit its forward movement. If during the further movement of the master switch the current in the motor circuit exceeds the safe value, the relay A drops and the controller locking device prevents further movement of the master switch until the current in the motor circuit has fallen sufficiently to allow the relay A to pull up again. The resistance r¹ can, if desired, be made of such a value that its insertion in and removal from the circuit of the coil 7 will keep constant the pull exerted by the magnetism of the coil 7 upon the core 11 as the air gap is varied between this core and the fixed core 10. In this way the relay may be made to operate within a small change of current in the operating circuit.

What I claim as new and desire to secure by Letters Patent of the United States is,—

1. In combination, an electrical circuit in which the current varies, a circuit to be controlled, a relay comprising an actuating coil energized from said first named circuit, a second coil arranged to produce a magnetic field in opposition to and in excess of that normally produced by said actuating coil, a core movable in the field of said coils, means for decreasing the magnetic effect of the second mentioned coil when said core has moved into the field and for increasing the magnetic effect of said coil when said core has moved out of said field, and contacts in the circuit to be controlled opened and closed by said core in its movement.

2. In combination, an electrical circuit in which the current varies, a circuit to be controlled, a relay comprising an actuating coil energized from said first named circuit, a second coil arranged to produce a magnetic field in opposition to and in excess of that normally produced by said actuating coil, a core movable in the fields of said coils and biased for movement out of said field, means for automatically increasing the magnetic effect of the second mentioned coil after said core has moved out of the field and decreasing its magnetic effect after said core has moved into the field, and contacts in the circuit to be controlled by said core in its movement.

3. In combination, an electrical circuit in which the current varies, a circuit to be controlled, a relay comprising an actuating coil energized from said first named circuit, a second coil arranged to produce a magnetic field in opposition to and in excess of that normally produced by said actuating coil, a core movable in the fields of said coils and biased for movement out of said field, contacts controlled by said core arranged to interpose a resistance in the circuit of the second mentioned coil when said core has moved into the magnetic field and to remove said resistance from the circuit when said core has moved out of the field, and contacts in the circuit to be controlled opened and closed by said core in its movement.

4. In combination, an electrical circuit in which the current varies, a circuit to be controlled, a relay comprising an actuating coil energized from said first named circuit, a second coil arranged to produce a magnetic field in opposition to and in excess of that normally produced by said actuating coil, a core of magnetic material movable in the field of said coils and biased for movement out of the field but normally moved into the field by said second mentioned coil, contacts controlled by said core in its movement arranged to interpose a resistance in circuit with said second mentioned coil after the core has moved into the field and to remove said resistance from the circuit after the core has moved out of the field due to the increase in current in said actuating coil, and contacts in the circuit to be controlled opened and closed by said core in its movement.

5. In a motor control system, a motor, a source of current supply, a starting resistance, a controller for connecting said motor to said source and controlling the amount of resistance in the motor circuit, a relay comprising an actuating coil energized from the motor circuit a second coil arranged to produce a magnetic field in opposition to and in excess of that normally produced by said actuating coil, an inductive resistance, means coöperating with said controller for connecting said second mentioned coil to the source through said inductive resistance in the "on"

positions of the controller, a core of magnetic material movable in the fields of said coils, means for decreasing the magnetic effect of the second mentioned coil when said core has moved into the field and for increasing the magnetic effect of said coil when said core has moved out of said field, a locking device coöperating with said controller, and contacts controlled by said relay for controlling the operation of said locking device.

In witness whereof, I have hereunto set my hand this 20th day of May, 1908.

ARCHIBALD S. CUBITT.

Witnesses:
 BENJAMIN B. HULL,
 HELEN ORFORD.